United States Patent
Akatsuka et al.

(10) Patent No.: US 6,765,043 B2
(45) Date of Patent: Jul. 20, 2004

(54) EPOXY RESIN, EPOXY RESIN COMPOSITION, CURED EPOXY RESIN, AND MANUFACTURING METHOD THEREOF

(75) Inventors: Masaki Akatsuka, Hitachi (JP); Yoshitaka Takezawa, Hitachinaka (JP); Hisashi Morooka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/246,680

(22) Filed: Sep. 19, 2002

(65) Prior Publication Data

US 2003/0229159 A1 Dec. 11, 2003

(30) Foreign Application Priority Data

Jun. 7, 2002 (JP) ........................................ 2002-166452

(51) Int. Cl.$^7$ .............................. C08K 3/10; C08L 63/02
(52) U.S. Cl. ........................ 523/457; 525/523; 528/89; 528/99; 528/100
(58) Field of Search ........................ 523/457; 525/523; 528/89, 99, 100

(56) References Cited

U.S. PATENT DOCUMENTS 5,270,404 A * 12/1993 Earls .......................... 525/481
5,811,504 A 9/1998 Shiota et al.

FOREIGN PATENT DOCUMENTS

| JP | 07-90052 | 4/1995 |
| JP | 9-118673 | 5/1997 |

* cited by examiner

*Primary Examiner*—Philip Tucker
*Assistant Examiner*—D. Aylward
(74) *Attorney, Agent, or Firm*—Antonelli, Terry, Stout & Kraus, LLP

(57) ABSTRACT

An epoxy resin that contains, in a molecule, two mesogens coupled by a folded chain, is provided using a method that ensures easy synthesis of such an epoxy resin, and a uniform epoxy resin composition is provided based on this epoxy resin. The epoxy resin includes a major compound having a structure expressed by the Chemical Formula (1), and a method is provided for manufacturing the epoxy resin by reaction of (A) an epoxy resin with one mesogen contained in a molecule and (B) a compound with two elements of active hydrogen contained in a molecule, with the percentage composition of (B) active hydrogen with respect to (A) epoxy group being 0.25 and over, up to and including 0.7.

2 Claims, No Drawings

EPOXY RESIN, EPOXY RESIN COMPOSITION, CURED EPOXY RESIN, AND MANUFACTURING METHOD THEREOF

BACKGROUND OF THE INVENTION

The present invention relates to an epoxy resin, epoxy resin composition, cured epoxy resin and a method of manufacture thereof.

An epoxy resin composition, based on an epoxy resin containing mesogen, is characterized by excellent mechanical and thermal properties and has been studied from various aspects.

For example, the Japanese Application Patent Laid-Open Publication No. Hei 07-90052 contains the description of an epoxy resin composition whose essential components are a biphenolic epoxy resin and a polyvalent phenolic resin curing agent derived from polyvalent phenol containing two or more phenolic hydroxyl groups coupled where mutual aromatic rings are adjacent to each other.

Further, the Japanese Application-Patent Laid-Open Publication No. Hei 09-118673 and U.S. Pat. No. 5,811,504 contain a description of an epoxy resin having, in a molecule, two mesogens coupled by a folded chain.

SUMMARY OF THE INVENTION (Problems to be Solved by the Invention)

However, since the melting point of an epoxy resin containing mesogen in a molecule is generally high, the gellation time is short for an epoxy resin composition that is mixed with an epoxy resin curing agent in a molten state, and the resultant handling difficulty has been a problem. Further, two steps are required to synthesize an epoxy resin containing, in a molecule, two mesogens coupled by a folded chain. High costs are needed in the phase of industrialization aimed at mass synthesis.

To solve these problems, it is an object of the present invention to provide an epoxy resin that contains in a molecule, two mesogens coupled by a folded chain, using a method that ensures easy synthesis of-such an epoxy resin, and to offer an epoxy resin composition based on this epoxy resin.

(Means for Solving the Problems)

The foregoing-object can be-attained by the present invention described below.

(1) An epoxy resin comprising a compound having a structure expressed by the following Chemical Formula:

[Chemical Formula 1]

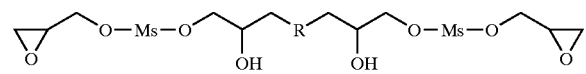

(1)

(where Ms denotes a mesogen and R a spacer)

(2) A method for manufacturing an epoxy resin by reaction of (A) an epoxy resin with one mesogen contained in a molecule and (B) a compound with two elements of active hydrogen contained in a molecule, with the percentage composition of the (B) active hydrogen with respect to the (A) epoxy group being 0.25 and over, up to and including 0.7.

(3) An epoxy resin composition comprising an epoxy resin with mesogen and a curing agent for the epoxy resin characterized in that the aforementioned epoxy resin having mesogen is an epoxy resin described in the aforementioned item (1).

(4) A conductive paste comprising an epoxy resin with mesogen, a curing agent and a conducting agent characterized in that the aforementioned epoxy resin with mesogen is an epoxy resin described in the aforementioned item (1).

(5) A cured epoxy resin obtained by heating and curing an epoxy resin composition comprising an epoxy resin with mesogen and a curing agent for the epoxy resin, wherein the aforementioned epoxy resin with mesogen is an epoxy resin described in the aforementioned item (1).

DETAILED DESCRIPTION OF THE INVENTION

Description of the Preferred Embodiments

The details of the present invention will be described with reference to various embodiments.

The epoxy resin according to the present invention is defined as being a compound with more than one epoxy contained in a molecule. The epoxy resin composition refers to a mixture formed by adding any one of an epoxy resin curing agent, catalyst and additive to an epoxy resin. The cured epoxy resin denotes a crosslinked structure formed by curing the aforementioned epoxy resin composition by heating or other means. The mesogen according to the present invention denotes a functional group exhibiting a liquid crystal property. More specifically, biphenyl, terphenyl, phenyl benzoate, azobenzene, stilbene group, azomethine and their derivatives are included.

Especially, the epoxy resin (A) containing one mesogen in a molecule in the sense used in the present Specification refers to a compound having one aforementioned mesogen in a molecule and more than one epoxy group. More specifically, it includes biphenyl epoxy resin, terphenyl epoxy resin, phenylbeozoate epoxy resin, stilbene epoxy resin, azomethine epoxy resin and their derivatives. From the viewpoint of ease in formation, biphenyl epoxy resin is preferred. Further, there is no restriction in the number of epoxy groups in each molecule so long as it is more than one. Two or more epoxy groups are preferred from the viewpoint of forming a crosslinking structure. Four or less epoxy groups are preferable to ensure handling ease.

Further, a compound with two elements of active hydrogen contained in one molecule, in the sense used in the present specification, denotes a compound having in one molecule, two elements of active hydrogen that is capable of reacting with epoxy group. More specifically, it includes a monoamine, such as alkyl monoamine, benzylamine and aniline; a dicarbonic acid, such as aliphatic dicarboxylic acid, phthalic acid, isophthalic acid and terephthalic acid; and a diphenol, such as catechol, resorcinol, hydroquinone, bisphenol A, bisphenol F and biphenol. To ensure handling ease, it is preferred to use benzylamine or aliphatic dicarboxylic acid or diphenol having a carbon number of 2 to 6.

As described above, the epoxy resin expressed in Chemical Formula (1) can be obtained by reaction of compounds (A) and (B). Further, the epoxy resin containing the intended compound expressed by Chemical Formula (1) can be obtained by reaction with the percentage composition of the (B) active hydrogen with respect to the (A) epoxy group being 0.25 and over, up to and including 0.7. Here there is no restriction to the structure of spacer R in Formula 1. This portion is introduced as part of the structure of the compound having two elements of active hydrogen (B) in one molecule.

[Chemical Formula (1)]

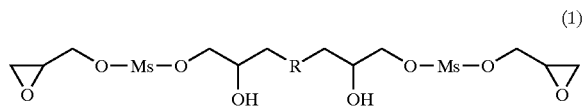

(1)

(where Ms denotes a mesogen and R a spacer)

Reaction between (A) and (B) is carried out as shown in Chemical Formula (2).

[Chemical Formula (2)]

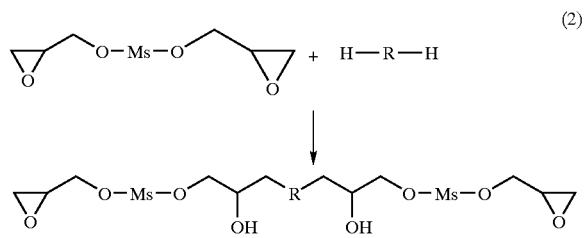

(2)

As described above, this compound can be produced in one reaction. Further, the crystallinity can be reduced and the melting point can be lowered because the molecular weight can be provided with variations. If the percentage composition of the (B) active hydrogen with respect to the (A) epoxy group is below 0.25, the effect of lowering the melting point is hardly exhibited. If it exceeds 0.7, gellation will occur in the process of manufacture, resulting in a handling failure.

The epoxy resin curing agent according to the present specification refers to a compound capable of forming a crosslinked structure through reaction with the epoxy group contained in the epoxy resin. More specifically, it includes polyamine based curing agents, such as diethylene triamine, triethylene tetramine, tetraethylene pentamine, diethylamino propylamine, polyamidoamine, mensendiamine, isophorone diamine, metaxylene diamine, diaminodiphenyl methane, diamino diphenylether, diamino diphenylsulfone, and metaphenylene diamine; curing agents of acid anhydride, such as phthalic acid anhydride, tetrahydro phthalic anhydride, hexahydro phthalic anhydride, methyl tetrahydro phthalic anhydride, methyl hexahydro hydride, methyl nadic anhydride, didodecyl succinic anhydride, chlorendic anhydride, pyromellitic anhydride, benzophenone tetracarboxylic anhydride, ethylene glycol bis-(anhydrotrimate), methyl cyclohexane tetra carboxylic anhydride, trimellitic anhydride and polyazelaic anhydride; polyphenol based curing agents, such as phenol novolak, catechol novolak and cresol novolak; polymercaptan based curing agents, such as trioxane trimethylene and mercaptan; polysulfide based curing agents; and catalysis based curing agents, such as benzyl dimethylaimne, 2-(dimethylamino methyl)phenol, 2,4, 6, tris(dimethylamonomethyl) phenol, 2-methyl imidazole, 2-ethyl 4-methyl imidazole, 2-undesyl imidazole, 2-heptadesyl imidazole, 2-phenyl imidazole, 1-benzyl 2-methyl imidazole, 1-cyanoethyl -2-methyl imidazole, boron amine trifluoride complex, dicyan diamide, triphenyl phosphine, adipic acid hydrazide, aromatic diazonium salt, diallyl iodoniumu salt, triallyl sulfonium alt, triallyl selenium salt and ketimine. They each can be used independently, or two or more of them can be combined for use.

Further, curing accelerating agents of the epoxy resin composition include tertiary amines, such as 1, 8-diazabicyclo (5, 4, 0), undecen-7, triethylene diamine, benzyl dimethyl amine, triethanol amine, and tris(dimethyl amino methyl) phenol; imidazoles, such as Such as 2-methyl imidazole, 2-phenyl imidazole, 2-phenyl 4 -methyl imidazole and 1-benzyl 2-phenyl imidazole; organic phosphines, such as tributyl phosphine, triphenyl phosphine and diphenyl phosphine; and tetraphenyl boron salts, such as tetraphenyl phosphonium tetraphenyl borate, triphenyl phosphine tetraphenyl borate; and 2-ethyl 4-methyl imidazole-tetraphenyl borate.

The blending ratio of the epoxy resin curing agent is determined by the working conditions and applications. Normally, it should be 15 parts by weight, preferably 5 parts by weight, with respect to 100 parts by weight of epoxy resin. If it is less than 0.01 wt %, the curing reaction acceleration effect will be small. If it exceeds 15 wt %, the insulation property of the cured substance will be reduced, and the performance and reliability of the applied product will be deteriorated.

Further, filling materials can be added to the epoxy resin composition, depending on the purpose and application. For example, fiber and powder made of the following substances are each used independently or in combination: inorganic substances, such as silica, crushed stone, silica sand, calcium carbonate, barium hydroxide, alumina, magnesium oxide, boron nitride, aluminum nitride, aluminum fluoride, aluminum hydroxide, talc, clay, karyon, glass powder, glass fiber; and organic substances, such as carbon, graphite, polyester and polyamide.

Compared with the hitherto known epoxy resin composition containing epoxy resin with mesogen and an epoxy resin curing agent, the epoxy resin composition comprising the epoxy resin mainly consisting of the substances given in the aforementioned Formula (1) and an epoxy resin curing agent is characterized by long gellation time and easy handling. This makes it possible to synthesize a uniformly cured epoxy resin without local variation.

Such an epoxy resin composition is suitable for use as adhesion, casting, sealing, molding and lamination materials.

Further, the present invention can be easily applied as conductive paste to the conductive parts of electrical equipment and electronic devices by adding a conducting agent to the aforementioned epoxy resin composition. The conducting agent is preferred to contain any one of silver powder, gold powder, copper powder and carbon. Further, the aforementioned conductive paste can be coated on an appropriate conductive substrate (coated material) and the coated membrane-can be cured at the temperature range from 80 to 250° C., preferably from 120 to 180° C.

Further, such an epoxy resin composition can be used as a coating film for electrodeposition. In this case, it is preferred to add one or two catalysts selected from a lead compound, zirconium compound, cobalt compound, aluminum compound, manganese compound, copper compound, zinc compound, iron compound, chromium compound, nickel compound, tin compound and others. These compounds include chelate compounds, such as zirconium, cobalt acetylacetonate, aluminum acetylacetonate, manganese acetylacetonate and titanium acetylacetonate; products of chelating reaction between a compound having a B-hydroxyamino structure and lead oxide; and carboxylates, such as 2-ethyl lead heanoate, lead naphthenate, lead octylate, lead benzoate, lead acetate, lead lactate, lead glycolate and zirconium octylate. These metallic compounds are preferably used in such a way that the metal content with respect to epoxy resin will be 0 wt % or less, more preferably, within the range from 0.5 to 5 wt %.

The aforementioned conductive paste can be made into a uniform one by heating, mixing, melting, separating or kneading the aforementioned components together with various additives collectively or separately using a proper combination of dispersing and melting devices, such as an agitator, mixer, three rolls and planetary mixer, as required. It is preferred that pressure and bubbles be removed from the epoxy resin composition before it is used.

Further, when the epoxy resin composition is used as a paste, a semiconductor can be provided after the semiconductor and a support member have been bonded by this paste. To bond the semiconductor onto the support member, such as a lead frame, using this paste, the semiconductor is crimped using a heating device, such as an oven and heat block, after paste has been coated according to the dispensing method, screen printing method, stamping method or others, and is heated and cured.

The specific details of an embodiment according-to-the present invention will be described with reference to Table 1.

The following list indicates the types and abbreviations of (A) an epoxy resin containing one mesogen in a molecule, (B) a compound containing two elements of active hydrogen in a molecule, and an epoxy resin curing agent that have been used.

<(A) Epoxy Resin Containing One Mesogen in a Molecule>
BGE: biphenol glycidyl ether (epoxy equivalent: 149)
TMBGE: 3, 3', 5, 5'-tetramethylbiphenol diglycidyl ether (epoxy equivalent: 177)

<(B) Compound Containing Two Elements of Active Hydrogen in a Molecule>
CA: Catechol (active hydrogen equivalent: 55)
HQ: Hydroquinone (active hydrogen equivalent: 55)
AA: Adipic acid (active hydrogen equivalent: 73)
BA: benzylamine (active hydrogen equivalent: 53.5)

<Epoxy Resin Curing Agent>
DDM:. Diamino diphenyl methane (active hydrogen equivalent: 49.5)>

TABLE 1

| Embodiment No. | Epoxy resin (A) | Epoxy resin (B) | Composition* | Melting point (° C.) | Epoxy resin composition Gellation time** (min) | Cured epoxy resin Heat conductivity (W/m · K) |
| --- | --- | --- | --- | --- | --- | --- |
| 1 | BGE | CA | 0.25 | 150 | 10 | 0.35 |
| 2 | BGE | CA | 0.50 | 148 | 12 | 0.35 |
| 3 | BGE | CA | 0.70 | 145 | 11 | 0.37 |
| 4 | BGE | AA | 0.25 | 133 | 16 | 0.36 |
| 5 | BGE | AA | 0.50 | 130 | 17 | 0.38 |
| 6 | BGE | AA | 0.70 | 130 | 15 | 0.37 |
| 7 | BGE | BA | 0.25 | 130 | 17 | 0.38 |
| 8 | BGE | BA | 0.50 | 125 | 20 | 0.40 |
| 9 | BGE | BA | 0.70 | 123 | 18 | 0.38 |
| 10 | BGE | HQ | 0.25 | 134 | 16 | 0.44 |
| 11 | BGE | HQ | 0.50 | 130 | 18 | 0.44 |
| 12 | BGE | HQ | 0.70 | 128 | 17 | 0.42 |

*Number of active hydrogen elements with respect to epoxy group
**Measured at the temperature 10 degrees higher than the melting point of the epoxy resin used Embodiment 1

2.75 grams of CA was added to 29.8 grams of BGE molten by heating up to 170° C., and was subjected to agitation and reaction at 170° C. for one minute. In this case, the percentage composition of the active hydrogen in CA with respect to the epoxy resin in the BGE was 0.25. Then, the temperature was lowered to room temperature to obtain a crystalline solid.

The melting point of this epoxy resin measured to be as low as 150° C. In this case, this melting point was found as the temperature of the first endothermic peak reactant was put to DSC analysis.

(The description on the melting point applies also to the following Embodiments 2 to 15 and reference examples 1 to 12).

It was molten again at 160° C., which is 10° C. higher than the melting point of the epoxy resin. At 160° C., measurement was made of the gellation time of the epoxy resin composition to which 7.425 grams of DDM, as the stoichiometric volume with respect to the epoxy group remaining in the reactant was added. The measured gellation time was as long as 10 minutes. The gellation time was used as the time required to stir and solidify the epoxy resin component on the hot plate heated to the set temperature. (The description on the gellation time applies also to the following Embodiments 2 to 15 and reference examples 1 to 12).

The thermal conductivity of the cured epoxy resin synthesized by a thermosetting-process of the epoxy resin composition at 150° C. for four hours and at 180° C. for four hours was as high as 0.35W/m·K. The thermal conductivity is the value across the width of the sample examined by the plate comparison method. The average temperature of the sample at the time of measurement was about 80° C., and borosilicate glass was used as a standard sample. (The description on the thermal conductivity applies also to the following Embodiments 2 to 15 and reference examples 1 to 12).

Embodiments 2 and 3

Table 1 shows the percentage composition of active hydrogen in CA with respect to the epoxy group in the BGE according to Embodiments 2 and 3. Otherwise, the conditions are almost the same as those for Embodiment 1. Table 1 also shows the result of measuring the melting point and gellation time in the same manner as in Embodiment 1 using these epoxy resins. In this case, the temperature in the measurement of the gellation time was 10° C. higher than the melting point of the reactant. (The description on the temperature for measurement of gellation time applies also to the following Embodiments 4 to 15 and reference examples 1 to 12).

The melting point of these epoxy resin was as low as 145 to 148° C. The gellation time of the epoxy resin composition using these epoxy resins was as long as 11 to 12 minutes. The thermal conductivity of the cured epoxy resin synthesized by a thermosetting process of the epoxy resin composition at 150° C. for four hours and at 180° C. for four hours was as high as 0.35 to 0.37 W/m·K.

Reference Examples 1 and 2

Table 2 shows the percentage composition of active hydrogen in CA with to the epoxy group in the BGE according to Embodiments 1 and 2. Otherwise, the conditions are almost the same as those for Embodiment 1. Table 1 also shows the result of measuring the melting point and gellation time in the same manner as in Embodiment 1 using these reactants.

TABLE 2

| Reference Example No. | Epoxy resin (A) | Epoxy resin (B) | Epoxy resin Composition* | Melting point (° C.) | Epoxy resin composition Gellation time** (min) | Cured epoxy resin Heat conductivity (W/m · K) |
|---|---|---|---|---|---|---|
| 1 | BGE | CA | 0.20 | 160 | 3 | 0.31 |
| 2 | BGE | CA | 0.75 | Gellation | — | — |
| 3 | BGE | AA | 0.20 | 160 | 4 | 0.30 |
| 4 | BGE | AA | 0.75 | Gellation | — | — |
| 5 | BGE | BA | 0.20 | 160 | 4 | 0.31 |
| 6 | BGE | BA | 0.75 | Gellation | — | — |
| 7 | BGE | HQ | 0.20 | 161 | 3 | 0.31 |
| 8 | BGE | HQ | 0.75 | Gellation | — | — |
| 9 | BGE | — | — | 162 | 2 | 0.30 |

*Number of active hydrogen elements with respect to epoxy group
**Measured at the temperature 10 degrees higher than the melting point of the epoxy resin used The melting point of the epoxy resin in Reference Example 1 is as high as 160° C. The gellation time of the epoxy resin composition using the epoxy resin was as short as 3 minutes. The thermal conductivity of the cured epoxy resin synthesized by a thermosetting process of the epoxy resin composition at 150° C. for four hours and at 180° C. for four hours was as low as 0.31W/m·K.

The epoxy resin in Reference Example 2 was gelled in the phase of mixing with DDM.

Embodiments 4 to 6

In Embodiments 4 to 6, "AA" was used as (B) a compound having two elements of active hydrogen in a molecule. Table 1 shows the percentage composition of active hydrogen in AA with respect to the epoxy group in the BGE according to Embodiments 4 to 6. Otherwise, the conditions are almost the same as those for Embodiment 1. Table 1 shows the result of measuring the melting point and the gellation time in the same manner as in Embodiment 1 using these reactants.

The melting point of these epoxy resins was as low as 130 to 133° C. The gellation time of the epoxy resin composition using these epoxy resins was as long as 15 to 17 minutes. The thermal conductivity of the cured epoxy resin synthesized by a thermosetting process of the epoxy resin composition at 150° C. for four hours and at 180° C. for four hours was as high as 0.36 to 0.38 W/m·K.

Reference Examples 3 and 4

In Reference Examples 3 and 4, "AA" was used as (B) a compound having two elements of active hydrogen in a molecule. Table 2 shows the percentage composition of active hydrogen in M with respect to the epoxy group in the BGE according to Reference Example 3 and 4. Otherwise, the conditions are almost the same as those for Embodiment 1. The BGE and AA reactants were synthesized. Table 2 shows the result of measuring the melting point and the gellation time in the same manner as in Embodiment 1 using these reactants.

The melting point of the epoxy resin was as high as 160° C. The gellation time of the epoxy resin composition using the epoxy resin was as short as 4 minutes. The thermal conductivity of the cured epoxy resin synthesized by a thermosetting process of the epoxy resin composition at 150° C. for four hours and at 180° C. for four hours was as low as 0.30 W/m·K.

The epoxy resin in Reference Example 4 was gelled in the phase of mixing with DDM.

Embodiments 7 to 9

In Embodiments 7 to 9, "BA" was used as (B) a compound having two elements of active hydrogen in a molecule. Table 1 shows the percentage composition of active hydrogen in BA with respect to the epoxy group in the BGE. Otherwise, the conditions are almost the same as those for Embodiment 1. Table 1 shows the result of measuring the melting point and the gellation time in the same manner as in Embodiment 1 using these reactants.

The melting point of these epoxy resins was as low as 123 to 130° C. The gellation time of the epoxy resin composition using these epoxy resins was as long as 17 to 20 minutes. The thermal conductivity of the cured epoxy resin synthesized by a thermosetting process of the epoxy resin composition at 150° C. for four hours and at 180° C. for four hours was as high as 0.38 to 0.40 W/m·K.

Reference Examples 5 and 6

In Reference Examples 5 and 6, "BA" was used as (B) a compound having two elements of active hydrogen in a molecule. Table 2 shows the percentage composition of active hydrogen in BA with respect to the epoxy group in the BGE. Otherwise, the conditions are almost the same as those for Embodiment 1; Table 2 shows the result of measuring the melting point and the gellation time in the same manner as in Embodiment 1 using these reactants.

The melting point of the epoxy resin in Reference Example 5 was as high as 160° C. The gellation time of the epoxy resins composition using the epoxy resin was as short as 4 min. The thermal conductivity of the cured epoxy resin synthesized by a thermosetting process of the epoxy resin composition at 150° C. for four hours and at 180° C. for four hours was as low as 0.31 W/m·K.

The epoxy resin in Reference Example 6 was gelled in the phase of mixing with DDM.

Embodiments 10 to 12

In Embodiments 10 to 12, "HQ" was used as a compound having two elements of active hydrogen in a molecule. Table 1 shows the percentage composition of active hydrogen in HQ with respect to the epoxy group in the BGE. Otherwise, the conditions are almost the same as those for Embodiment 1. Table 1 shows the result of measuring the melting point and the gellation time in the same manner as in Embodiment 1 using these reactants.

The melting point of these epoxy resins was as low as 128 to 134° C. The gellation time of the epoxy resin composition using these epoxy resins was as long as 16 to 18 minutes. The thermal conductivity of the cured epoxy resin synthesized by a thermosetting process of the epoxy resin composition at 150° C. for four hours and at 180° C. for four hours was as high as 0.42 to 0.44 W/m·K.

Embodiments 7 and 8

In Embodiments 7 and 8, "HQ" was used as (B) a compound having two elements of active hydrogen in a molecule. Table 2 shows the percentage composition of active hydrogen in HQ with respect to the epoxy group in the BGE. Otherwise, the conditions are almost the same as those for Embodiment 1. Table 2 shows the result of measuring the melting point and the gellation time in the same manner as in Embodiment 1 using these reactants.

The melting point of these epoxy resins in Reference Example 7 was as high as 161° C. The gellation time of the epoxy resin composition using these epoxy resins was as short as 4 minutes. The thermal conductivity of the cured epoxy resin synthesized by thermosetting process of the epoxy resin composition at 150° C. for four hours and at 180° C. for four hours was as low as 0.31 W/m·K.

The epoxy resin in Reference Example 8 was gelled in the phase of mixing with DDM.

Reference Example 9

In Reference Example 9, the BGE was used independently. The melting point and the gellation time were measured in the same manner as in Embodiment 1.

The melting point of the epoxy resin was as high as 162° C. The gellation time of the epoxy resin composition using the epoxy resin was as short as 2 minutes. The thermal conductivity of the cured epoxy resin synthesized by a thermosetting process of the epoxy resin composition at 150° C. for four hours and at 180° C. for four hours was as low as 0.30 W/m·K.

Embodiment 13

2.675 grams of BA was added to 35.4 grams of TMBGE molten by heating and was subjected to agitation and reaction at 125° C. for 5 minutes. The percentage composition of the active hydrogen in BA with respect to epoxy group in the TMBGE was 0.25. Then, the temperature was lowered to room temperature to obtain a crystalline solid. The melting point and the gellation time was measured in the same manner as in Embodiment 1 using these reactants.

The melting point of this epoxy resin was as low as 55° C. The gellation time of the epoxy resin composition using these epoxy resins was as long as 20 minutes. The thermal conductivity of the cured epoxy resin synthesized by a thermosetting process of the epoxy resin composition at 150° C. for four hours and at 180° C. for four hours was as high as 0.30 W/m·k.

TABLE 3

| Em-bodi-ment No. | Epoxy resin | | | Epoxy resin composition | Cured epoxy resin |
| --- | --- | --- | --- | --- | --- |
| | (A) | (B) | Compo-sition* | Melting point (° C.) | Gellation time** (min) | Heat conductivity (W/m · K) |
| 13 | TMBGA | BA | 0.25 | 55 | 20 | 030 |
| 14 | TMBGA | BA | 0.50 | 50 | 25 | 0.31 |
| 15 | TMBGA | BA | 0.70 | 50 | 23 | 0.32 |

*Number of active hydrogen elements with respect to epoxy group
**Measured at the temperature 10 degrees higher than the melting point of the epoxy resin used Embodiments 14 and 15

In Embodiments 14 and 15, Table 3 shows the percentage composition of active hydrogen in BA with respect to the epoxy group in the TMBGE. Otherwise, the conditions are almost the same as those for Embodiment 13. Table 3 shows the result of measuring the melting point and the gellation time in the same manner as in Embodiment 1 using these reactants.

The melting point of these epoxy resin was as low as 50° C. The gellation time of the epoxy resin composition using the epoxy resin was as long as 23 to 25 minutes. The thermal conductivity of the cured epoxy resin synthesized by a thermosetting process of the epoxy resin composition at 150° C. for four hours and at 180° C. for four hours was as high as 0.31 to 0.32 W/m·K.

Reference Examples 10 and 11

In Reference Examples 10 and 11, Table 4 shows the percentage composition of active hydrogen in BA with respect to the epoxy group in the TMBGE. Otherwise, the conditions are almost the same as those for Embodiment 10. Table 4 shows the result of measuring the melting point and the gellation time in the same manner as in Embodiment 1 using these reactants.

The melting point of the epoxy resin in Reference Example 10 was as high as 110° C. The gellation time of the epoxy resin composition using the epoxy resin was as short as 7 minutes. The thermal conductivity of the cured epoxy resin synthesized by a thermosetting process of the epoxy resin composition at 150° C. for four hours and at 180° C. for four hours was as low as 0.26 W/m·K.

The epoxy resin in Reference Example 11 was gelled in the phase of mixing with DDM.

TABLE 4

| Re-ference Example No. | Epoxy resin | | | Epoxy resin composition | Cured epoxy resin |
| --- | --- | --- | --- | --- | --- |
| | (A) | (B) | Com-posi-tion* | Melting point (° C.) | Gellation time** (min) | Heat conductivity (W/m · K) |
| 10 | TMBGA | BA | 0.20 | 110 | 7 | 0.26 |
| 11 | TMBGA | BA | 0.72 | Gellation | — | — |
| 12 | TMBGA | — | — | 115 | 5 | 0.26 |

*Number of active hydrogen elements with respect to epoxy group
**Measured at the temperature 10 degrees higher than the melting point of the epoxy resin used Reference Example 12

In Reference Example 12, the TMBGE was used independently. The melting point and the gellation time were measured in the same manner as in Embodiment 1.

The melting point of the epoxy resin was as high as 115° C. The gellation time of the epoxy resin composition using the epoxy resin was as short as 5 minutes. The thermal conductivity of the cured epoxy resin synthesized by a thermosetting process of the epoxy resin composition at 150° C. for four hours and at 180° C. for four hours was as low as 0.26 W/m·K.

Embodiment 16

At 65° C., 7.425 grams of DDM, as stoichiometric volume with respect to the epoxy group remaining in the reactant, was added to the epoxy resin produced in Embodiment 13. Further, 45.5 grams of silver powder (amount equivalent to 50 wt %) was dispersed by a planetary mixer, and a conductive paste was obtained. In this case, it could be dispersed without gellation.

Reference Example 13

9.9 grams of DDM was added to the epoxy resin produced in Embodiment 11, and 45.3 grams of silver powder (amount equivalent to 50 wt %) was dispersed by a planetary mixer, and a conductive paste was obtained. In this case, however, gellation occurred during the step of dispersion.

Effects of the Invention

The present invention provides an epoxy resin that contains, in a molecule, two mesogens coupled by a folded chain, using a method that ensures easy synthesis of such an epoxy resin, and offers a uniform epoxy resin composition based on this epoxy resin.

What is claimed is:

1. A conductive paste comprising an epoxy resin with mesogen, curing agent and conducting agent, characterized in that said epoxy resin with mesogen is an epoxy resin comprising the compound having a structure expressed by the following Chemical Formula:

[Chemical Formula (1)]

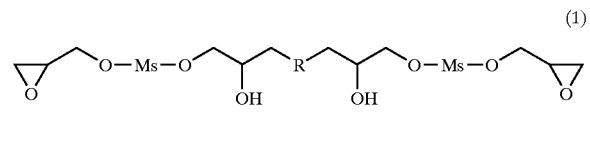
(1)

(where Ms denotes a mesogen and R a spacer).

2. A cured epoxy resin obtained by heating and curing an epoxy resin composition comprising an epoxy resin with mesogen and curing agent for epoxy resin, wherein said epoxy resin with mesogen is an epoxy resin comprising the compound having a structure expressed by the following Chemical Formula:

[Chemical Formula (1)]

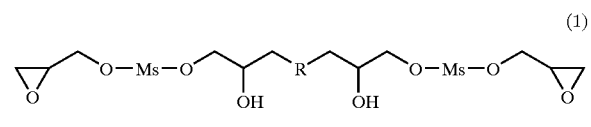
(1)

(where Ms denotes a mesogen and R a spacer).

* * * * *